United States Patent
Heitzler et al.

(10) Patent No.: US 8,378,769 B2
(45) Date of Patent: Feb. 19, 2013

(54) MAGNETIC FIELD GENERATOR FOR A MAGNETOCALORIC THERMAL APPLIANCE AND PROCESS FOR ASSEMBLING SUCH GENERATOR

(75) Inventors: Jean-Claude Heitzler, Horbourg-Wihr (FR); Christian Muller, Strasbourg (FR)

(73) Assignee: Cooltech Applications, S.A.S., Holtzheim (FR)

( * ) Notice: Subject to any disclaimer, the term of this patent is extended or adjusted under 35 U.S.C. 154(b) by 107 days.

(21) Appl. No.: 12/857,019

(22) Filed: Aug. 16, 2010

(65) Prior Publication Data

US 2012/0038442 A1    Feb. 16, 2012

(51) Int. Cl.
  *H01F 7/02*    (2006.01)
(52) U.S. Cl. ........................................... 335/306
(58) Field of Classification Search ............... 335/306
  See application file for complete search history.

(56) References Cited

U.S. PATENT DOCUMENTS

| | | | |
|---|---|---|---|
| 4,764,743 A * | 8/1988 | Leupold et al. | 335/306 |
| 4,953,555 A * | 9/1990 | Leupold et al. | 600/421 |
| 5,291,171 A * | 3/1994 | Kobayashi et al. | 335/306 |
| 5,319,339 A * | 6/1994 | Leupold | 335/306 |
| 5,347,254 A * | 9/1994 | Leupold | 335/306 |
| 5,635,889 A * | 6/1997 | Stelter | 335/306 |
| 5,886,609 A * | 3/1999 | Stelter | 335/306 |
| 5,976,369 A * | 11/1999 | Howe et al. | 210/222 |
| 6,573,817 B2 * | 6/2003 | Gottschalk | 335/306 |
| 6,680,663 B1 * | 1/2004 | Lee et al. | 335/306 |
| 7,148,777 B2 * | 12/2006 | Chell et al. | 335/306 |

\* cited by examiner

*Primary Examiner* — Alexander Talpalatski
(74) *Attorney, Agent, or Firm* — Davis & Bujold, PLLC

(57) ABSTRACT

A magnetic field generator (1) for a magnetocaloric thermal appliance comprising at least one magnetising structure (2) creating a constant magnetic field in at least one air gap (3) in which at least one magnetocaloric element (4) is arranged. The magnetising structure (2) comprises first (5) and second (6) magnetic poles arranged facing each other on each side of a symmetry plane (P) and each made up of an assembly of permanent magnets (7, 8) and of a ferromagnetic element (9). The magnetic field generator is characterised in that the ferromagnetic element (9) presents a face (F1) protruding with respect to the assembly forming the magnetic pole (5, 6) and the two ferromagnetic elements (9) of the magnetising structure (2) are arranged face to face with a distance forming the at least one air gap (3, 13, 23) of the magnetising structure (2).

14 Claims, 10 Drawing Sheets

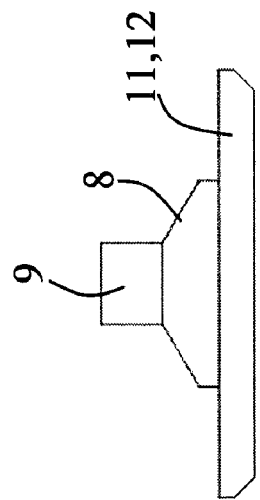
FIG. 9A
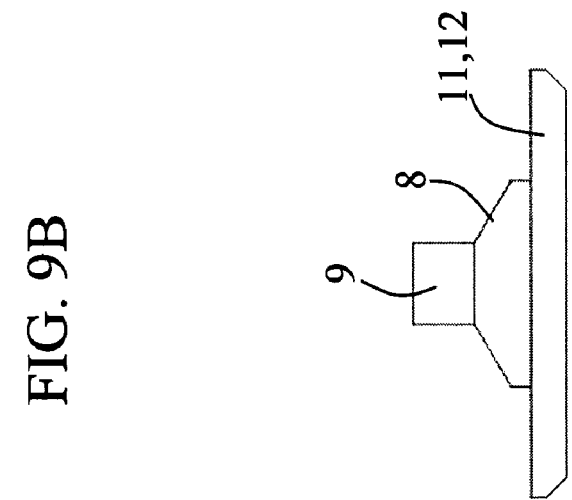
FIG. 9B
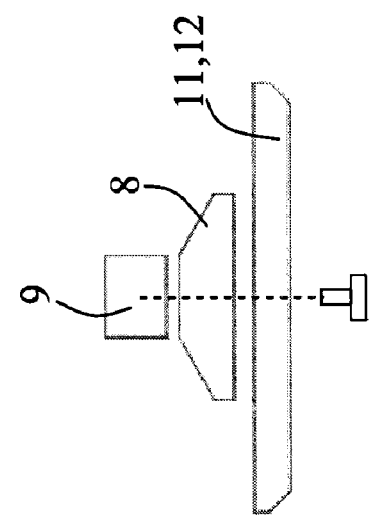
FIG. 10A
FIG. 10B

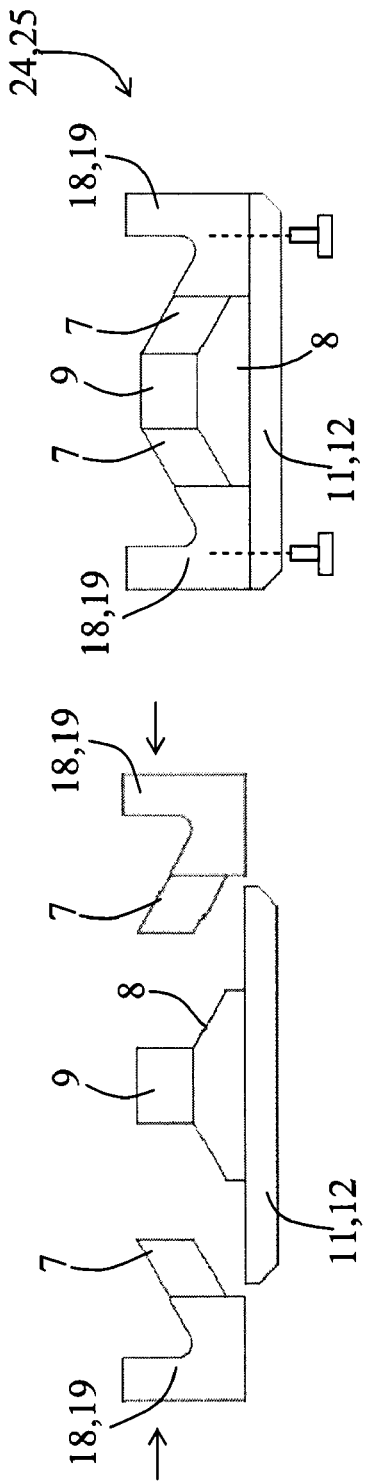
FIG. 11A
FIG. 11B
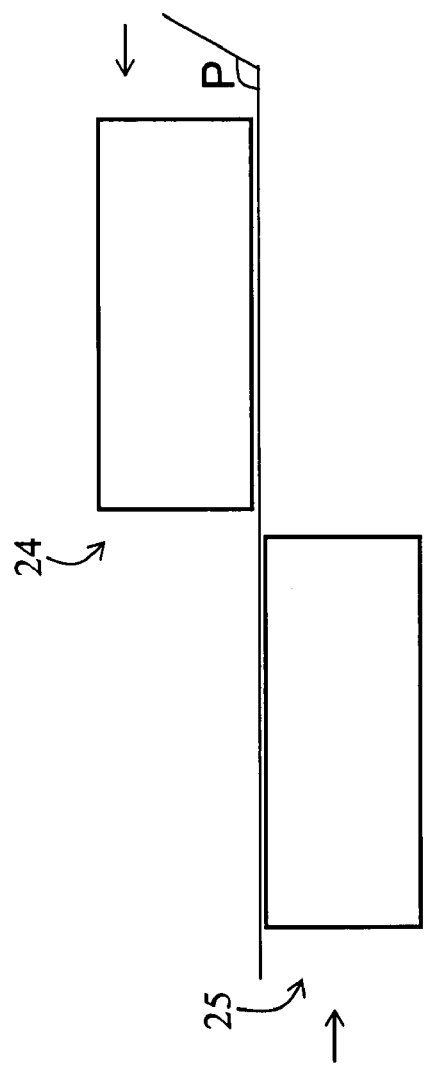
FIG. 12

MAGNETIC FIELD GENERATOR FOR A MAGNETOCALORIC THERMAL APPLIANCE AND PROCESS FOR ASSEMBLING SUCH GENERATOR

TECHNICAL SCOPE

The present invention relates to a magnetic field generator for a magnetocaloric thermal appliance, said magnetic field generator including at least one magnetising structure creating a constant magnetic field in at least one air gap in which at least one magnetocaloric element is arranged, said magnetising structure containing a first and a second magnetic pole arranged facing each other on each side of a symmetry plane and each made up of an assembly of permanent magnets and of a ferromagnetic element.

The object of the invention also relates to a process for assembling such a magnetic field generator.

PRIOR TECHNIQUE

In order to achieve in an economical way a strong magnetic field in a restricted space, it is known to realise an assembly of permanent magnets. The literature describes such assemblies, notably for an application in the domain of medical imaging based on magnetic resonance. In this domain, coils of permanent magnets are prepared that are arranged side by side. The permanent magnets used however present a complex geometrical structure that is difficult to produce and this increases the cost of assembling the magnets.

The transposition of such structures of magnets cannot therefore be envisaged in the context of applications with a more restricted volume, particularly in the domain of magnetocaloric thermal generators. In fact, in these appliances, it is essential to generate a uniform and intense magnetic field in an air gap corresponding approximately to the volume of a magnetocaloric material or element so that the magnetic field created can successively activate and deactivate magnetically one or more magnetocaloric materials that are alternatively introduced in and removed from magnetocaloric element or material, which will have the effect of increasing the thermal power and therefore the output of such a magnetocaloric thermal appliance.

Moreover, in these appliances, it is in addition desirable that no magnetic field should subsist outside the air gap. This allows increasing the magnetocaloric effect that is directly dependant on the difference of magnetic field undergone by the magnetocaloric material between its position in the air gap and its position outside the air gap. If a magnetic field subsists outside the air gap, the magnetocaloric elements do not pass from a null magnetic field to an intense magnetic field between these two positions. The output of the appliance is therefore not optimal because the efficiency of the magnetocaloric cycles and the magnetocaloric effect are limited.

DESCRIPTION OF THE INVENTION

The present invention aims to overcome these disadvantages by proposing a magnetic field generator designed for being integrated into a magnetocaloric thermal appliance and presenting an intense, uniform and concentrated field in its air gap. This magnetic field generator is also easy to produce, it is easy to assemble and its components are of simple geometrical shapes and therefore with low cost prices.

For this purpose, the invention concerns a magnetic field generator as defined in the preamble, characterised in that said ferromagnetic element presents a face F1 protruding with respect to the assembly forming said magnetic pole and in that the two ferromagnetic elements of said magnetising structure are arranged face to face with a separation forming said at least one air gap of the said magnetising structure.

The magnetocaloric elements are designed for being in thermal contact with a heat transfer fluid circulating from their cold end to their hot end during a first phase of the magnetic cycle that corresponds to a phase in which the magnetocaloric materials or elements are subjected to an increase in their temperature and from their hot end towards their cold end during a second phase of the magnetic cycle in which the magnetocaloric materials or elements are subjected to a reduction of their temperature. The thermal contact between the heat transfer fluid and the magnetocaloric elements can be obtained by a heat transfer fluid passing along or across the magnetocaloric materials. To this effect, the magnetocaloric elements can be made up by one or more magnetocaloric materials and may be permeable to the heat transfer fluid. They can also include passages for fluid circulation extending between the two ends of the magnetocaloric materials. These passages may be created by the porosity of the magnetocaloric materials or by machined channels or obtained by a set of plates in magnetocaloric material.

The heat transfer fluid is preferably a liquid. It is therefore possible to use, for example, pure water or with addition of antifreeze product, a product containing glycol or a brine.

In each magnetic pole, the ferromagnetic element may include a quadrangular transversal section, each of its three faces F2, F3, F4 located outside said air gap being in contact with a face of a corresponding permanent magnet.

The faces F2, F4 of the ferromagnetic element may be approximately perpendicular to the face F1 located in the air gap and are in contact with a face of a permanent magnet called lateral magnet whose direction of magnetisation is approximately perpendicular to said perpendicular faces F2, F4.

The face F3 of the ferromagnetic element, opposite to the face F1 located in the air gap and called opposite face F3, is advantageously in contact with a permanent magnet called opposite magnet whose direction of magnetisation is approximately perpendicular to said opposite face F3.

The faces of the permanent magnets and of the ferromagnetic element that are in contact are preferably of identical dimension and shape.

In the first magnetic pole, the direction of magnetisation of the lateral magnets and of the opposite magnet may be oriented opposite the ferromagnetic element and, in the second magnetic pole, the direction of magnetisation of the lateral magnets may be oriented towards the ferromagnetic element, in a direction opposite to that of the lateral magnets of the first magnetic pole, and the direction of magnetisation in the opposite magnet being the same as that of the opposite magnet of the first magnetic pole.

In each magnetic pole, the lateral magnets may have a transversal parallelepipedic section and the opposite magnets may present two faces in contact with corresponding faces of the lateral magnets having identical shape and dimension.

The first and second magnetic poles may include respectively a first and a second magnetic field-conductive fastening device made of a ferromagnetic material and presenting a contact surface with a corresponding face of the opposite magnet of said first and second magnetic poles.

A magnet ora ferromagnetic part may be placed in the symmetry plane between said first and second magnetic poles and may form an air gap with each of the two corresponding faces F1 of the ferromagnetic elements of said first and second magnetic poles.

Said generator may include two mounting armatures closing laterally said generator and arranged in a plane approximately perpendicular to the symmetry plane.

Said generator may include a single magnetising structure; the mounting armatures may be in a ferromagnetic material and connect laterally said first and second magnetic poles.

It may also include at least two magnetising structures arranged side by side, said mounting armatures being made of a non-magnetic material.

The mounting armatures may be in contact with an opposite magnet and a lateral magnet of said first and second magnetic poles and the fastening devices may present a boss in the two zones adjacent to the contact surfaces between each mounting armature and the corresponding opposite magnet.

The mounting armatures may be made up of two parts connected with each other with an adjustable distance between them.

Each mounting armature may include a permanent magnet on its side wall located facing the magnetising structure and whose direction and the direction of magnetisation of said permanent magnet are identical to those of the opposite magnets of said magnetising structure.

Also with this purpose, the invention relates to a process for assembling such a magnetic field generator, characterised in that it consists of:

a) producing a first assembly including a first magnetic pole and a first part of two mounting armatures, b) producing a second assembly including a second magnetic pole and the other part of said two mounting armatures c) arranging said two assemblies facing one another so as to form an air gap by means of a translation movement of one with respect to the other parallel to a symmetry plane.

The stages a) and b) may consist in:

i) connecting a ferromagnetic element with a quadrangular section to a magnetic field-conductive fastening device by interposing therein a permanent magnet called opposite magnet, for example, by screwing, ii) connecting each of the two permanent magnets having a parallelepipedic cross-section, called lateral magnets, to a part of two mounting armatures, for example, by bonding, iii) then, connecting together the sub-assemblies obtained from a) and b) so that each lateral magnet includes a surface in contact with the ferromagnetic element and a surface in contact with the opposite magnet and that each part of the two mounting armatures presents a surface in contact with a fastening device, for example by screwing the fastening device to the part of said mounting armatures.

BRIEF DESCRIPTION OF THE DRAWINGS

The present invention and its advantages will be better revealed in the following description of three embodiments given as non limiting examples, in reference to the drawings in appendix, in which:

FIGS. 9A, 9B, 10A, 10B, 11A, 11B and 12 represent the different stages in the assembly of the magnetic field generator represented in FIG. 3.

ILLUSTRATIONS OF THE INVENTION

Figure 1:
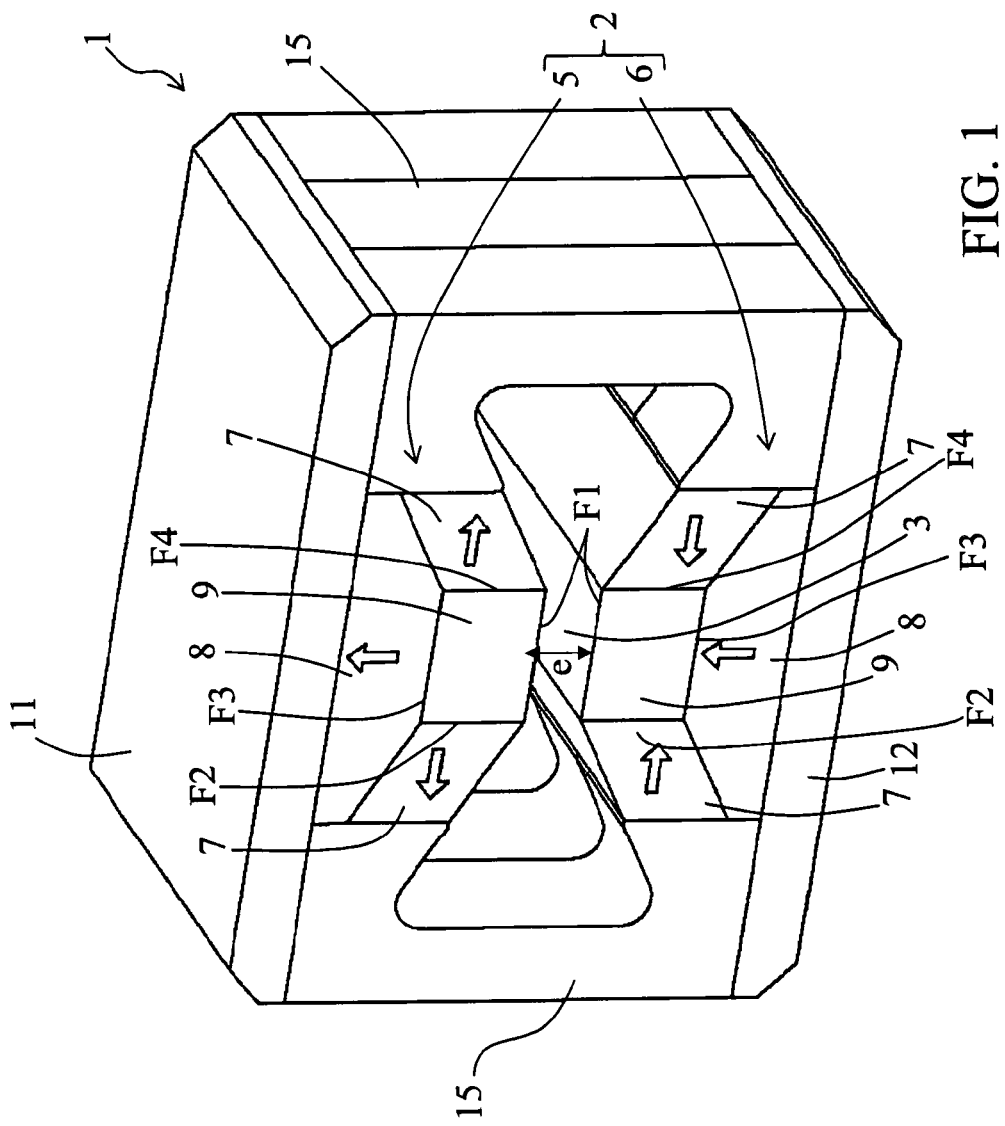
FIG. 1 is a perspective view of a first embodiment of a magnetic field generator according to the invention

FIG. 1 represents an elementary embodiment of a magnetic field generator 1 according to the invention. This magnetic field generator 1 is composed in this case of a single magnetising structure 2 containing two magnetic poles 5 and 6 arranged facing each other while delimiting an air gap 3. The first magnetic pole 5 is made up of an assembly of permanent magnets 7 and 8 and of a ferromagnetic element 9. With the exception of the direction of magnetisation of the permanent magnets 7 and 8, the two magnetic poles 5 and 6 are identical.

In each magnetic pole 5, 6, the ferromagnetic element 9 forms a magnetic field concentrator and is protruding with respect to the permanent magnets 7 and 8. It includes a transversal cross-section in the form of a rectangle and four lateral faces F1, F2, F3 and F4. One lateral face F1 is located in the air gap 3. The faces F2 and F4, which are perpendicular to the face F1 located in the air gap 3 and called perpendicular faces F2, F4 are fixed or are intimately linked each with a permanent magnet called lateral magnet 7. Each lateral magnet 7 presents a parallelepipedic cross-section and the faces F2 and F4 of the ferromagnetic element 9 present the same dimension as the corresponding faces of the lateral magnets 7. The face F3 of the ferromagnetic element 9 called opposite face F3 and opposite to the face F1 located in the air gap is fixed or intimately linked with a magnet called opposite magnet 8. This opposite magnet 8 also presents a face whose dimension corresponds to that of the corresponding face F3 of the ferromagnetic element 9. It presents in addition, a transversal cross-section in the form of a hexagon whose two faces have the same dimension as one face of each lateral magnet 7 to which they are fixed or are intimately linked.

The two assemblies each made of two lateral magnets 7 and an opposite magnet 8 fixed to a ferromagnetic element 9 and forming the two magnetic poles 5, 6 are connected with each other laterally by two mounting armatures 15 made of a ferromagnetic material and forming a return of the magnetic field. In the variant represented, each mounting armature 15 is in contact with a face of a lateral magnet 7 and a face of the opposite magnet 8 of each magnetic pole 5, 6.

Figure 2:
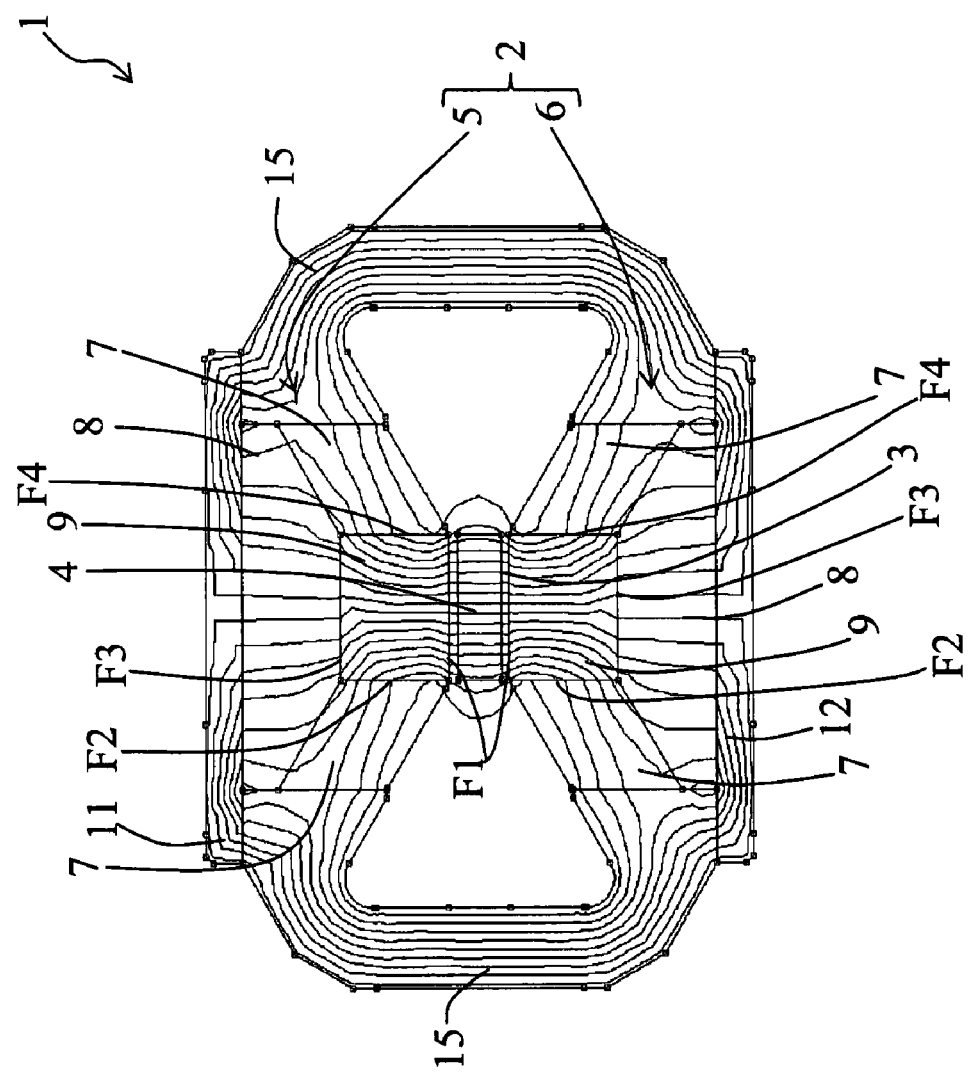
FIG. 2 is a transversal cross-section view of the magnetic field generator of FIG. 1 representing the lines of the magnetic field.

Preferably, and as can be seen from FIGS. 1 and 2, the mounting armatures 15 present a form including a recess in which one or more magnetocaloric elements 4 can be arranged. In fact, the magnetic field generator 1, 10, 20, 30, 40, 50 according to the invention is meant for subjecting at least one magnetocaloric element 4 to a variable magnetic field by means of a relative movement of said magnetocaloric element 4 with reference to the air gap 3, 13, 23 of said magnetic field generator. Thus, it is necessary, on the one hand, to provide an air gap 3, 13, 23 whose volume allows positioning at least one magnetocaloric element 4 so that it is subjected to an intense and constant magnetic field and on the other hand, to provide a volume outside this air gap 3 in which the magnetic field is null or very weak and may contain said magnetocaloric element 4. This volume outside the air gap 3 may be the internal volume of the magnetic field generator outside of its air gap 3, 13, 23 or the volume located outside the magnetic field generator.

Figure 3:
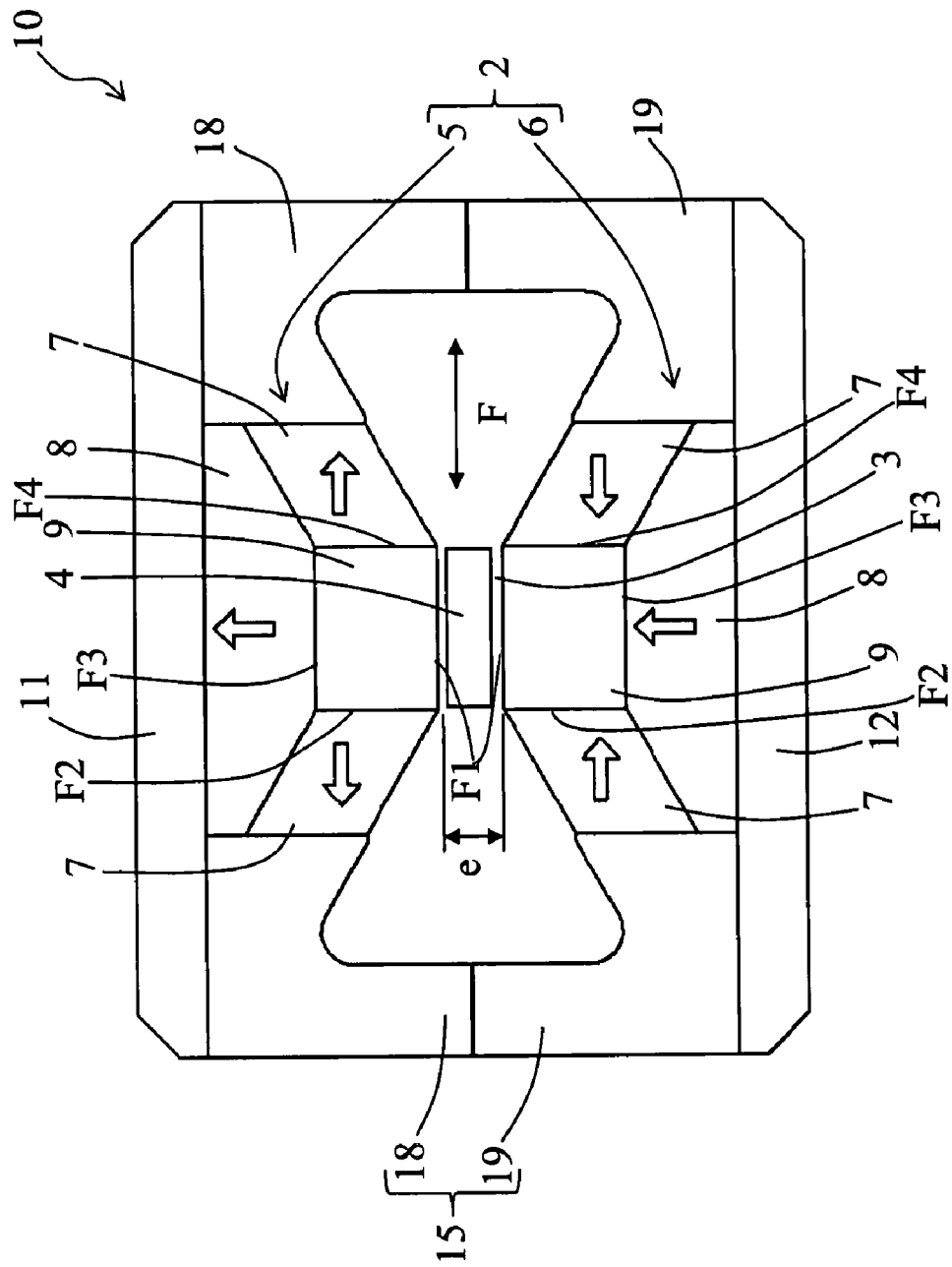
FIG. 3 is a front view of a variant of the generator of FIG. 1.

For this purpose, in the configuration of the magnetic field generator 1 represented in FIG. 1, the volume outside the air gap 3 is delimited by the two mounting armatures 15 that show a cross-section approximately in the shape of a C. These mounting armatures 15 may be produced in a single piece or by assembling several parts 18, 19 as shown in FIG. 3 illustrating a magnetic field generator 10 according to a first variant. In the magnetic field generators 1 and 10 of FIGS. 1 to 3, said magnetocaloric material or element 4 moves laterally on each side of the air gap 3 in the direction of one mounting armature 15, then in the direction of the other (see arrow F) in order to be subjected to successive heating and cooling depending on its position inside or outside the air gap 3.

Advantageously, the magnetic field generators 1 and 10 also include two fastening devices 11, 12 made of a ferromagnetic material and forming a magnetic bridge and a mounting plate. Each fastening device 11, 12 is in contact with an opposite magnet 8 of a magnetic pole 5, 6 and with the two mounting armatures 15.

With regard to the magnetisation of the magnets 7, 8, the direction of magnetisation of the lateral magnet 7 is perpendicular to the perpendicular faces F2, F4 and the direction of magnetisation of the opposite magnet 8 is perpendicular to said opposite face F3. In the first magnetic pole 5, the direction of magnetisation of the lateral magnets 7 and the opposite magnet 8 is oriented opposite to the ferromagnetic element 9 and in the second magnetic pole 6, the direction of magnetisation of the lateral magnets 7 is oriented towards the ferromagnetic element 9, that is, in a direction opposite to that of the lateral magnets 7 of the first magnetic pole 5 and the direction of magnetisation in the opposite magnet 8 being the same as that of the opposite magnet 8 of the first magnetic pole 6.

Such a configuration allows obtaining an intense field in the air gap 3 with few magnets and magnets easy to configure, presenting a low cost price. As an example, in the magnetic field generator 1 according to the invention, a magnetic field of 1.22 Tesla in the air gap 3 of a thickness e equal to 16 millimetres and permanent magnets 7 and 8 of 1.41 Tesla is obtained. The lines of the magnetic field circulating in this magnetic field generator 1 are illustrated in FIG. 2. It can be noted that in fact, these lines are numerous and preponderant in the air gap 3 in which a magnetocaloric element 4 is placed.

In the magnetic field generator 10 represented in FIG. 3, the two magnetic poles 5 and 6 may be arranged according to a variable distance allowing the adjustment of the thickness e of the air gap 3 depending on the thickness of the magnetocaloric element 4 and also on the intensity of the magnetic field. This adjustment is made by means of the two mounting armatures 15 that are each composed of two parts 18 and 19 whose distance can be adjusted by a system of screws or any other appropriate means.

FIGS. 9A, 9B, 10A, 10B, 11A, 11B and 12 represent the different stages in the assembly of the magnetic field generator 10 described in relation with FIG. 3.

A first stage in the assembly (stage i) represented in FIGS. 9A and 9B consists in fastening by bonding or any other equivalent means the face of a lateral magnet 7 to a part 18, 19 of a mounting armature 15. This stage is carried out for the four lateral magnets 7 of the magnetic field generator 10. A second stage (stage ii) represented in FIGS. 10A and 10B consists in connecting with each other by a clamping, screwing or any other equivalent means, a ferromagnetic element 9 of quadrangular cross-section to a fastening device 11, 12 in a ferromagnetic material by interposing therein an opposite magnet 8, this opposite magnet 8 may be simply supported or partially embedded in said fastening device 11, 12. These two stages i) and ii) may be carried out independently in any order.

The following stage (stage iii) represented in FIGS. 11A and 11B consists in connecting the sub-assemblies obtained from the stages i) and ii) in such a way that each lateral magnet 7 comprises a surface in contact with the ferromagnetic element 9 and a surface in contact with the opposite magnet 8 and that each part 18, 19 of a mounting armature 15 presents a surface in contact with a fastening device 11, 12. Here also, a fastening by screws is made between each fastening device 11, 12 and the corresponding part 18, 19 of the mounting armatures 15. Two assemblies 24, 25 are thus obtained.

The last stage represented schematically in FIG. 12 consists in positioning said assemblies 24, 25 facing each other, aligned in their axis of symmetry and to move them by means of a translation movement of one with respect to the other parallel to the symmetry plane P so that the parts 18 and 19 of the two mounting armatures 15 mate simultaneously and are self-positioned, for bringing the two ferromagnetic elements 9 face to face and forming the air gap 3.

The two assemblies 24, 25 can be fastened with respect to one another with a variable adjustment of the distance separating them by providing a spacer 13 (cf. FIG. 4) or an adjustment system using screws or a similar device.

Figure 4:
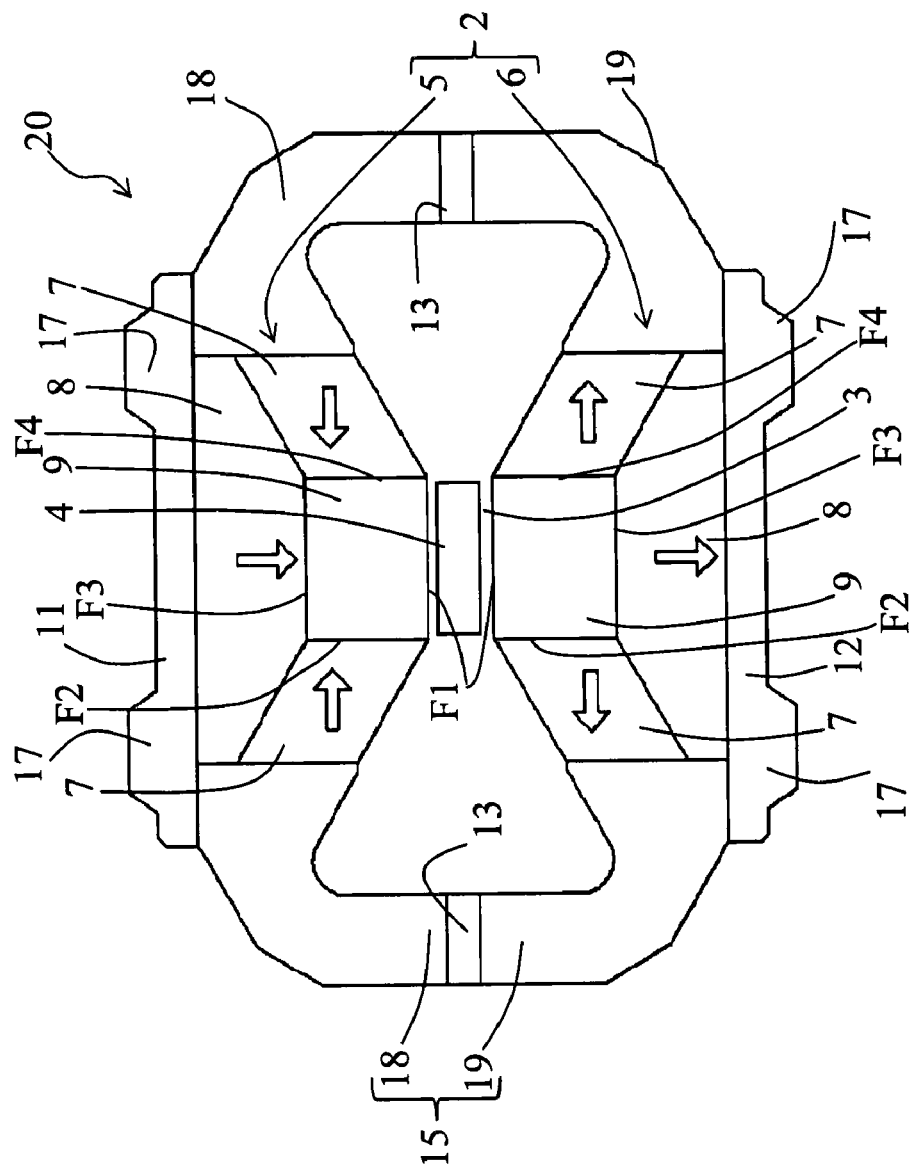
FIG. 4 is a front view illustrating another variant of the generator of FIG. 1.
Figure 5:
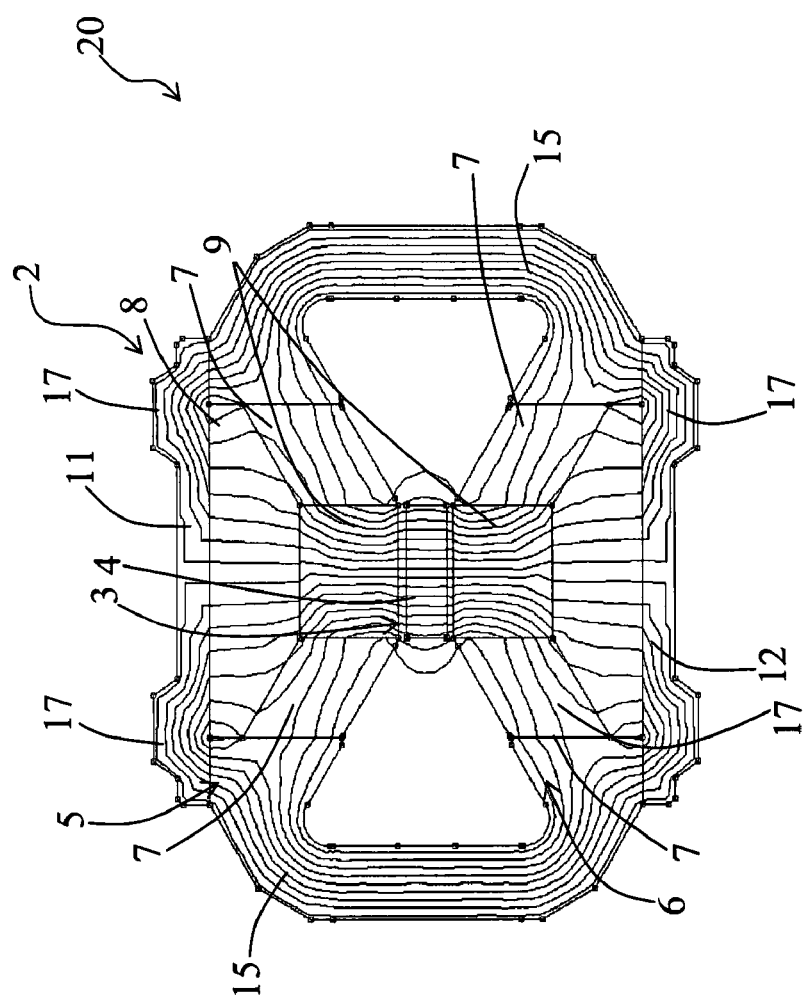
FIG. 5 is a transversal cross-section view of the generator of FIG. 4 representing the magnetic field lines.

FIGS. 4 and 5 represent a magnetic field generator 20 according to another embodiment. This magnetic field generator 20 presents the same advantages and a same magnetic field intensity in the air gap 3 as those relating to the magnetic field generators 1, 10 represented in FIGS. 1 to 3.

It is distinguished from the magnetic field generator 10 of FIG. 3 by the presence of a spacer 13 placed between the parts 18 and 19 of the mounting armature 15 whose thickness is chosen depending on the air gap 3. It is also distinguished by the presence of a boss 17 created in each fastening device 11, 12 at the level of the zones adjacent to the contact surfaces between each mounting armature 15 and an opposite magnet 8. These bosses 17 allow preventing a possible saturation of the magnetic field in said fastening devices 11, 12 and thus allow guarantying a maximum magnetic field in the air gap 3. FIG. 5 illustrates the magnetic field in said magnetic field generator 20 in which the gap between the two parts 18 and 19 of each mounting armature 15 is null.

Figure 6:
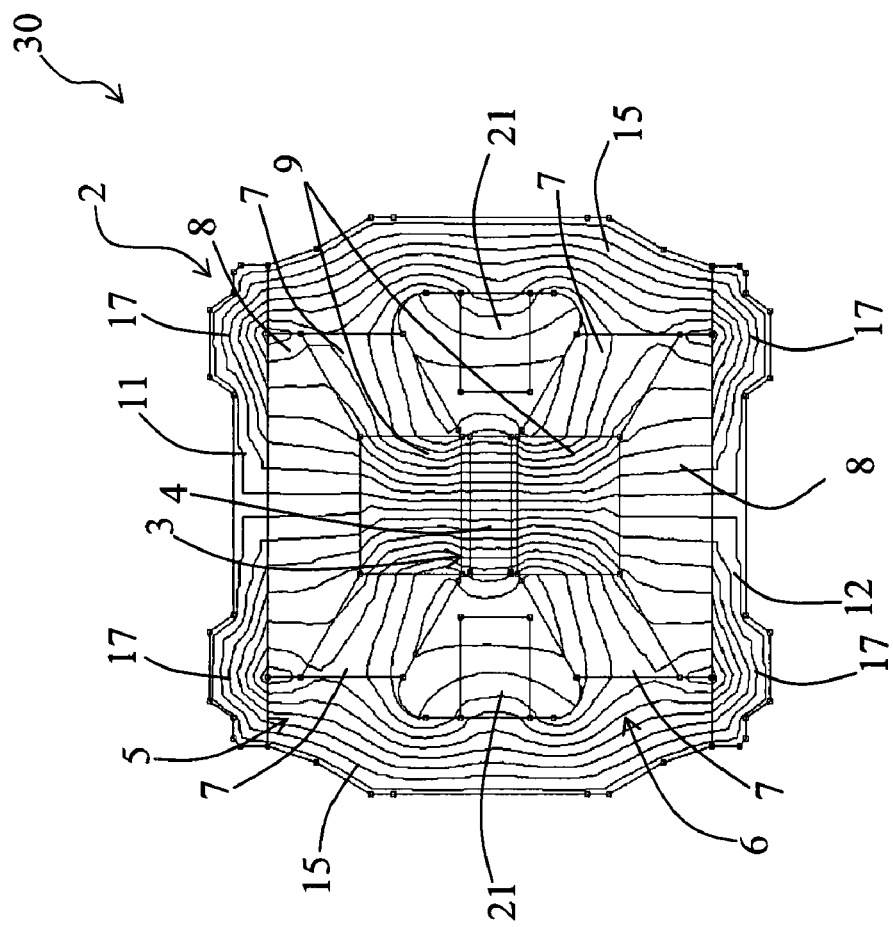
FIG. 6 is a transversal cross-section view of another variant of the generator of FIG. 1 representing the magnetic field lines.

FIG. 6 represents a magnetic field generator 30 according to yet another embodiment. This magnetic field generator 30 allows further increasing the magnetic field in the air gap 3 so as to reach 1.36 Tesla. It is distinguished from the magnetic field generator 20 represented in FIGS. 4 and 5 by the fact that the interior wall of each mounting armature 15 includes a permanent magnet 21 in which the orientation and the direction of magnetisation are identical to those of the opposite magnets 8.

In the magnetic field generator 30 illustrated in FIG. 6, the magnetocaloric element(s) 4 are designed for moving in the direction perpendicular to that of their movement in the magnetic field generator 1, 10 represented in FIGS. 1 to 3. It is also possible however to provide a volume for positioning said magnetocaloric elements 4 in the enclosure of this magnetic field generator 30. Such an arrangement can also be obtained easily by modifying the shape of the two mounting armatures 15, for example, by giving them a more arched shape than that represented in FIG. 6.

Figure 7:
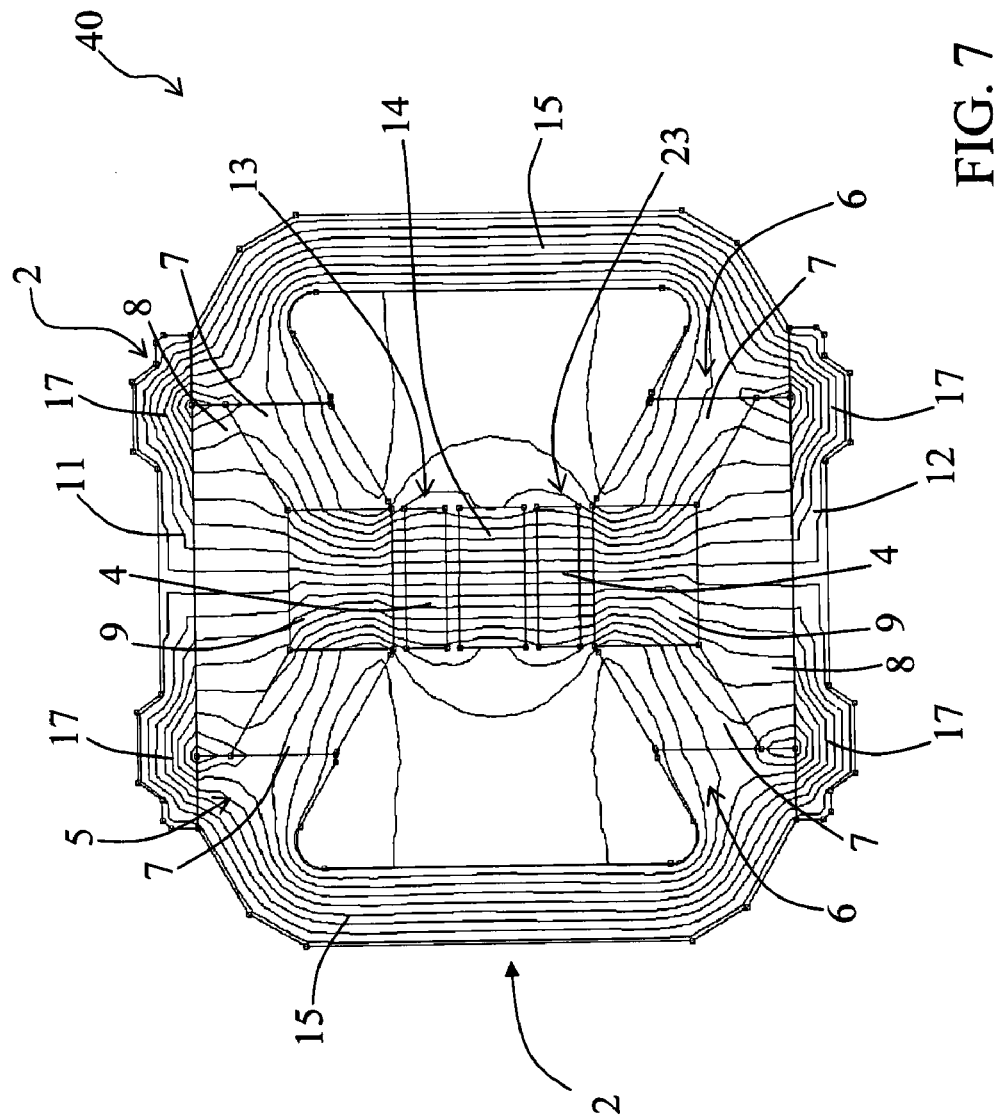
FIG. 7 is a transversal cross-section view of a second embodiment of the magnetic field generator comprising two air gaps and illustrating the magnetic field lines.

The magnetic field generator 40 represented in FIG. 7 is distinguished from that of FIG. 6 by the fact that it has two air gaps 13 and 23. A magnet 14 whose orientation and direction of magnetisation are identical to those of the opposite magnets 8 is positioned between the two ferromagnetic elements 9 of the magnetising structure 2. This magnet 14 can be replaced by a ferromagnetic part. This magnet or this ferromagnetic part 14 can be held in place by means of a thermoplastic material or by any other equivalent device, magnetic or non-magnetic. This magnet or this ferromagnetic part 14 thus forms with each ferromagnetic element 9 an air gap 13, 23.

The advantage of this configuration resides in the fact that for dimensions and weight approximately equivalent to those of the magnetic field generators 1, 10, 20 and 30 already described, it is possible to obtain two air gaps 13, 23 that can activate more magnetocaloric elements 4 and thus increase the output of a thermal appliance containing said magnetic field generator 40.

Figure 8:
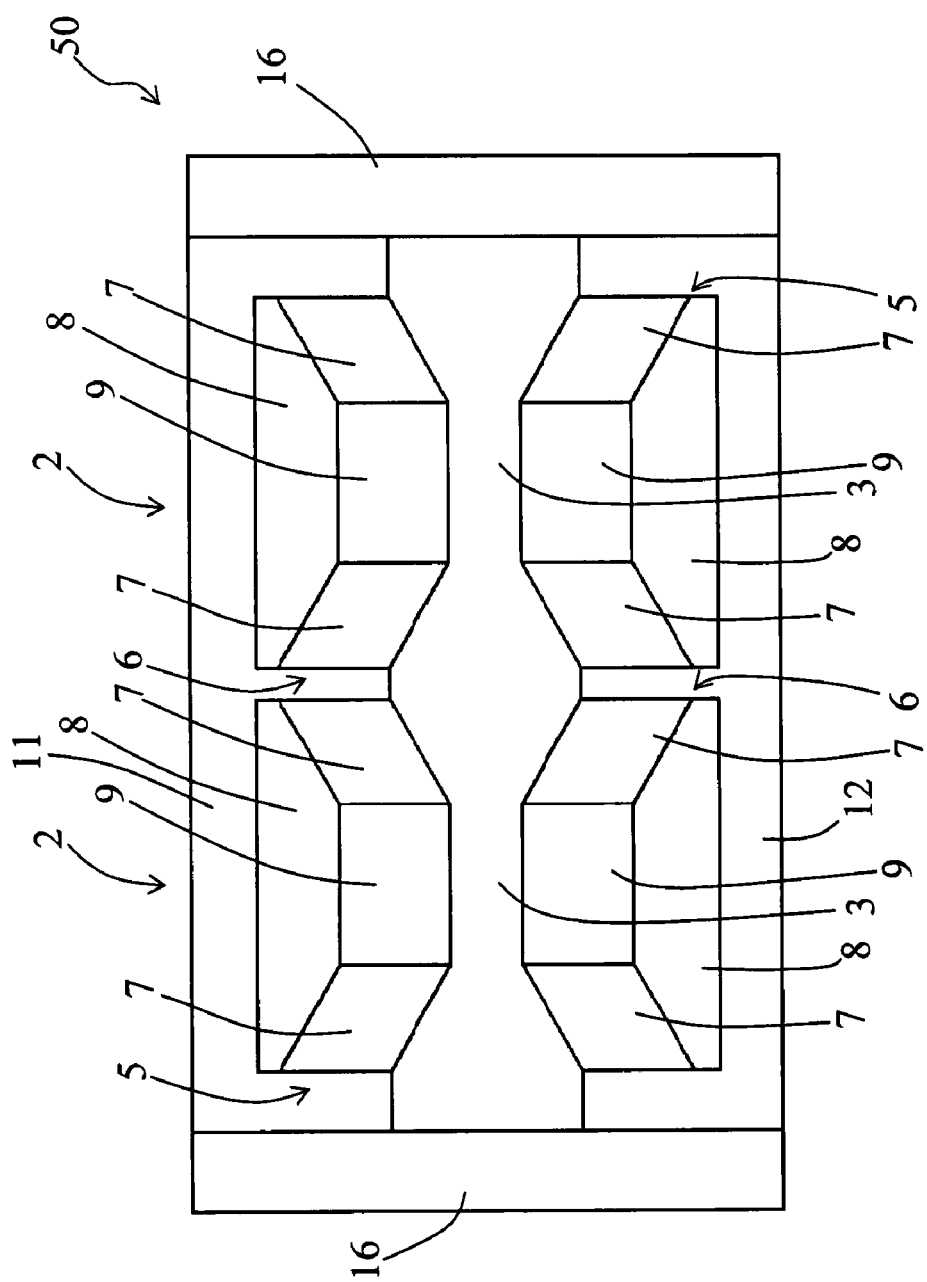
FIG. 8 is a transversal cross-section view of a third embodiment of the magnetic field generator comprising two magnetising structures and illustrating the magnetic field lines.

The magnetic field generator 50 represented in FIG. 8 on the other hand comprises two identical magnetising structures 2 arranged side by side. For obtaining a maximum magnetic field in the air gap 3 of each magnetising structure 2, it is necessary that the first magnetic pole 5 of a magnetising structure 2 should be placed by the side of the second magnetic pole 6 of the other magnetising structure 2. This allows creating a magnetic loop between the two magnetising structures 2. In this configuration, the mounting armatures 16 are made of a non-magnetic material.

This configuration also allows activating magnetically on more magnetocaloric elements 4, thereby increasing the output of a thermal appliance containing said magnetic field generator 50.

The configuration of the magnetic field generator 1, 10, 20, 30, 40, 50 according to the invention allows using permanent magnets 7, 8, 14 whose shape is easy to produce and whose magnetisation is anisotropic.

The magnetic field generators 1, 10, 20, 30, 40 and 50 illustrated by the set of figures are meant for being integrated in a thermal appliance containing at least one magnetocaloric element 4. This magnetocaloric element 4 may be made up of one or more magnetocaloric materials 4 and it is crossed by or is in contact with a heat transfer fluid circulating in an alternating manner in the direction of a first end of said magnetocaloric element 4, then in the direction of its second end, in a manner synchronised with the change of position of said magnetocaloric element 4, in and outside the air gap 3.

The magnetocaloric element 4 is preferably mounted sliding in the air gap 3, 13, 23 of the magnetic field generator and driven in a reciprocating or a continuous rotational movement.

POSSIBILITIES OF INDUSTRIAL APPLICATION

This description shows clearly that the invention allows reaching the goals defined, that is to say to offer a magnetic field generator whose manufacture is structurally simple and economical and that allows obtaining an intense magnetic field with relatively little magnetised material. Such a generator can notably find both industrial and domestic applications when it is integrated in a magnetocaloric thermal appliance meant for being used in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetic field generator (1, 10, 20, 30, 40, 50) for a magnetocaloric thermal appliance, the magnetic field generator (1, 10, 20, 30, 40, 50) comprising at least one magnetising structure (2) creating a constant magnetic field in at least one air gap (3) in which at least one magnetocaloric element (4) is arranged, the magnetising structure (2) containing first (5) and second (6) magnetic poles arranged facing each other on each side of a symmetry plane (P) and each made up of an assembly of permanent magnets (7, 8) and of a ferromagnetic element (9), the ferromagnetic element (9) of each of the first and the second magnetic poles (5, 6) presenting one face (F1) protruding with reference to the assembly forming the first and second magnetic poles (5, 6) and the ferromagnetic elements (9) of the first (5) and second (6) magnetic poles being arranged face to face with a distance forming the at least one air gap (3, 13, 23) of the magnetising structure (2), wherein a further permanent magnet (14) is placed in the plane (P), between the first (5) and second (6) magnetic poles and forms an air gap (13, 23) with each of the two corresponding faces (F1) of the ferromagnetic elements (9) of the first (5) and second (6) magnetic poles.

2. The generator according to claim 1, wherein in each magnetic pole (5, 6), the ferromagnetic element (9) has a quadrangular transversal cross-section and each of its three lateral faces (F2, F3, F4) located outside the air gap (3, 13, 23) is in contact with a face of the corresponding permanent magnets (7, 8).

3. The generator according to claim 2, wherein two lateral faces (F2, F4) of the ferromagnetic element (9) are approximately perpendicular to the face (F1) located in the air gap (3, 13, 23) and are in contact with a face of the permanent magnets called lateral magnets (7) whose direction of magnetisation is approximately perpendicular to the lateral faces (F2, F4).

4. The generator according to claim 3, wherein one lateral face (F3) of the ferromagnetic element (9), opposite the face (F1) located in the air gap (3, 13, 23) and called opposite face (F3), is in contact with the permanent magnet called opposite magnet (8) whose direction of magnetisation is approximately perpendicular to the opposite face (F3).

5. The generator according to claim 4, wherein the faces of the permanent magnets (7, 8) and of the ferromagnetic element (9) that are in contact have an identical shape and dimension.

6. The generator according to claim 4, wherein the first magnetic pole (5), the direction of magnetisation of the lateral magnets (7) and of the opposite magnet (8) respectively in contact with the corresponding ferromagnetic element (9) is oriented in an opposite direction to the ferromagnetic element (9) and, in the second magnetic pole (6), the direction of magnetisation of the lateral magnets (7) is oriented in a direction towards the ferromagnetic element (9), which is opposite to that of the lateral magnets (7) of the first magnetic pole (5) and the direction of magnetisation in the opposite magnet (8) is the same as that of the opposite magnet (8) of the first magnetic pole (5).

7. The generator according to claim 4, wherein each magnetic pole (5, 6), the lateral magnets (7) in contact with the corresponding ferromagnetic element (9) have a parallelepipedic transversal cross-section and the opposite magnets (8) in contact with the same ferromagnetic element (9) present two faces in contact with corresponding faces of the lateral magnets (7), the faces that are in contact have identical shape and dimension.

8. The generator according to claim 4, wherein the first (5) and second (6) magnetic poles contain respectively a first magnetic field-conductive fastening device (11) and a second magnetic field-conductive fastening device (12) made of a ferromagnetic material and presenting a contact surface with a corresponding face of the opposite magnet (8) of the first (5) and second (6) magnetic poles.

9. The generator according to claim 8, wherein the generator comprises two mounting armatures (15, 16) laterally closing the magnetic field generator (1, 10, 20, 30, 40, 50) and arranged in a plane approximately perpendicular to the symmetry plane (P).

10. The generator according to claim 9, wherein the generator contains a single magnetising structure (2) and the mounting armatures (15) are made of a ferromagnetic material and laterally connect the first (5) and second (6) magnetic poles.

11. The generator according to claim 10, wherein the mounting armatures (15) are in contact with an opposite magnet (8) and a lateral magnet (7) of the first and second magnetic poles (5, 6) and the fastening devices (11, 12) present a boss (17) in zones which are adjacent to the surfaces in contact between each mounting armature (15) and the corresponding opposite magnet (8).

12. The generator according to claim 10, wherein the mounting armatures (15) are made up of two parts (18 and 19) that are connected with one another and have an adjustable distance.

13. The generator according to claim 10, wherein each mounting armature (15) comprises a permanent magnet (21) on its lateral wall located facing the magnetising structure (2) and whose orientation and magnetisation direction of the permanent magnet (21) are identical to those of the opposite magnets (7) of the magnetising structure (2).

14. A magnetic field generator for a magnetocaloric thermal appliance, the magnetic field generator comprising at least one magnetising structure (2) having first and second magnetic poles (5, 6) that are symmetrically arranged with respect to a plane of symmetry (P), each of the first and the second magnetic poles (5, 6) comprises permanent magnets (7, 8) and a ferromagnetic element (9), the permanent magnets (7, 8) of each the first and the second magnetic poles (5, 6) abut the respective ferromagnetic element (9) such that each of the ferromagnetic elements (9) has only one exposed face (F1), the ferromagnetic elements (9) are aligned with each other and arranged within the respective one of the first and the second magnetic poles (5, 6) such that the exposed faces (F1) face each other, the exposed faces (F1) are spaced from each other and the plane of symmetry (P) and form an extended air gap (3) therebetween, an additional permanent magnet (14) is aligned with and located between the first and the second magnetic poles (5, 6) in the plane of symmetry (P) such that a first smaller air gap (13) is formed between the additional permanent magnet (14) and the exposed face (F1) of the ferromagnetic element (9) of the first magnetic pole (5) and a second smaller air gap (23) is formed between the additional permanent magnet (14) and the exposed face (F1) of the ferromagnetic element (9) of the second magnetic pole (6).

\* \* \* \* \*